United States Patent
Matsunaga et al.

(10) Patent No.: US 6,428,613 B1
(45) Date of Patent: Aug. 6, 2002

(54) CURING ACCELERATOR AND RESIN COMPOSITION

(75) Inventors: Shigeki Matsunaga; Sachiyo Shiiki, both of Kashima (JP)

(73) Assignee: Dainippon Ink and Chemicals Inc., Tokyo (JP)

( * ) Notice: Subject to any disclaimer, the term of this patent is extended or adjusted under 35 U.S.C. 154(b) by 8 days.

(21) Appl. No.: 09/585,324

(22) Filed: Jun. 2, 2000

(30) Foreign Application Priority Data

Jun. 3, 1999 (JP) .......................................... 11-156399

(51) Int. Cl.$^7$ ............................. C09D 11/00; C08K 5/04
(52) U.S. Cl. ................................ 106/31.58; 106/31.86; 106/31.43; 106/31.75; 106/264; 106/310; 524/398; 524/413; 524/435
(58) Field of Search .......................... 106/31.58, 31.86, 106/31.43, 31.75, 264, 310; 524/398, 413, 435

(56) References Cited

U.S. PATENT DOCUMENTS

| | | | | |
|---|---|---|---|---|
| 3,994,849 A | * | 11/1976 | Dunlop ................. 260/29.2 E |
| 4,631,087 A | | 12/1986 | Turner ........................ 106/252 |
| 4,720,352 A | * | 1/1988 | Pentronella et al. ........ 252/308 |
| 5,559,192 A | * | 9/1996 | Bors et al. ................... 525/300 |
| 6,001,913 A | * | 12/1999 | Thames et al. ............. 524/398 |
| 6,174,948 B1 | * | 1/2001 | Thames et al. ............. 524/398 |

FOREIGN PATENT DOCUMENTS

| | | |
|---|---|---|
| GB | 370 550 A | 4/1932 |
| GB | 498 011 A | 12/1938 |
| JP | 61-83263 | 4/1986 |
| JP | 03269070 | 11/1991 |

* cited by examiner

*Primary Examiner*—Helene Klemanski
*Assistant Examiner*—Veronica F. Faison
(74) *Attorney, Agent, or Firm*—Armstrong, Westerman & Hattori, LLP

(57) ABSTRACT

One object is to provide a curing accelerator which does not contain a lead soap, but has a curing property comparable to or surpassing that of a curing accelerator which contains a lead soap, and which does not color the coating. Another object is to minimize the amount of the cobalt soap if such is used. The curing accelerator for a resin having an unsaturated fatty acid group in its molecules contains a cobalt soap (A), a manganese soap (B), and an amino alcohol (C).

7 Claims, No Drawings

CURING ACCELERATOR AND RESIN COMPOSITION

BACKGROUND OF THE INVENTION

1. Field of the Invention

The present invention relates to a curing accelerator to be used with a resin for a coating or a printing ink which has an unsaturated fatty acid group in its molecules.

2. Description of Related Art

In general, to a coating or the like containing a resin having an unsaturated fatty acid group in the molecules of a drying oil or the like, such as an alkyd resin, a curing accelerator (drier) is added as a supplemental agent. As the curing accelerator, a metallic soap such as that of cobalt or lead has been hitherto used. However, in recent years, for the purpose of reducing pollution and improvement in the safety and the health of workers, there has been progress in the elimination of lead from curing accelerators. In addition, there has been progress in reduction of cobalt from curing accelerators, because of the unstable supply of cobalt bullion or the like. Accordingly, development of a curing accelerator in which the amounts of cobalt and lead used is restricted has become necessary.

Use of a large amount of cobalt soap in place of the lead soap is not practical although it improves the curing property, since it accelerates the curing of the surface of the coating film, which tends to give rise to wrinkles or shrinkage, and increases the cost of the resin.

Aluminum chelates are also useful as a substitute for lead soap (see Japanese Examined Patent Application, Second Publication (Kokoku), No. 61-50114). However, use of such aluminum chelates is limited since they color the resin reddish orange when used with an methyl ethyl ketone oxime, which is widely used as an anti-skinning agent in coatings, and contaminates the hue of the coating.

Zirconium soap is also useful as a substitute for lead soap. However, the adhesion of a coating film in which a zirconium soap is used is insufficient, and therefore such a coating has the disadvantage that it cannot be used for a general purpose coating.

There are additives such as 1,10-phenanthroline and 2,2'-bipyridyl, which can be used in order to enhance the activity of a curing accelerator, and the curing accelerating effect of such an additive in combination with a manganese soap has been known (see U.S. Pat. No. 2,565,897). However, although such a curing accelerator initially has a good curing accelerating effect, a coating blended with this curing accelerator has the disadvantage that the curing accelerating effect is degraded while the coating is stored.

Japanese Unexamined Patent Application, First Publication (Kokai), No. Hei 6-172689 discloses a mixture of bipyridyl and a cobalt soap as an additive for enhancing the activity of a curing accelerator. However such a mixture has a dark brown color and colors the coating. Therefore, this mixture has the disadvantage that it is difficult to use it in a white coating.

BRIEF SUMMARY OF THE INVENTION

An object to be achieved by the present invention is to provide a curing accelerator which does not contain a lead soap, but has a curing property comparable to or surpassing that of a curing accelerator which contains a lead soap, and which does not color the coating. Another object is to minimize the amount of the cobalt soap if such is used.

As the result of diligent research for achieving the above objects, the present inventors have found that blending a curing accelerator containing a cobalt soap, a manganese soap, and an amino alcohol with a resin for a coating or a printing ink which has a fatty acid group in its molecule enhances the activity of the cobalt soap, shortening the drying time even if a reduced amount of cobalt is used, causing neither deterioration of the drying effect nor coloration of the coating, and improving the gloss, the hardness, and the adhesion of the coating film, even though a lead soap is not used, in comparison with a conventional resin which has an unsaturated fatty acid group in its molecules and which is blended with a cobalt soap and a lead soap. Thus, the present inventors have accomplished the present invention.

Accordingly, in order to achieve the above objects, the present invention provides a curing accelerator containing a cobalt soap, a manganese soap, and an amino alcohol.

The present invention has the following aspects.

(1) A curing accelerator for a resin having an unsaturated fatty acid group in its molecules, the curing accelerator containing:
  a cobalt soap (A),
  a manganese soap (B), and
  an amino alcohol (C).

(2) A curing accelerator according to the above (1), wherein the amino alcohol is at least one selected from the group consisting of diethanolamine, diethyl ethanolamine, dibutyl ethanolamine, and n-butyl diethanolamine.

(3) A curing accelerator according to the above (1) or (2), which contains the amino alcohol in an amount of 1 to 3 parts by weight with respect to 1 part by weight of cobalt metal in the cobalt soap.

(4) A curing accelerator according to the above (1) or (2), which contains manganese metal in an amount of 0.1 to 1.0 parts by weight in the manganese soap with respect to 1 part by weight of cobalt metal in the cobalt soap.

(5) A coating composition containing as essential components a resin for a coating having an unsaturated fatty acid group in its molecules and a curing accelerator as in the above (1).

(6) A printing ink composition containing as essential components a resin for a printing ink having an unsaturated fatty acid group in its molecules and a curing accelerator as in the above (1).

(7) A curing accelerator for a resin having an unsaturated fatty acid group in its molecules, the curing accelerator consisting essentially of:
  a cobalt soap (A),
  a manganese soap (B),
  an amino alcohol (C), and
  a solvent.

The curing accelerator according to the present invention contains a cobalt soap, a manganese soap, and an amino alcohol, in which no lead soap is used. With the curing accelerator according to the present invention, even if the amount of the cobalt metal atoms (cobalt soap) added with respect to the non-volatile contents of the resin is reduced in comparison with a conventional curing accelerator, the time for drying the coating or the printing ink is shorter and the properties of the coating film (gloss, hardness, and adhesion) are better than those with a conventional curing accelerator. Accordingly, the curing accelerator according to the present invention is industrially significant.

DETAILED DESCRIPTION OF THE INVENTION

The curing accelerator contains as essential components a cobalt soap, a manganese soap, and an amino alcohol.

As the cobalt soap and the manganese soap for the present invention, any known and conventional ones can be used, examples of which include $C_7$ to $C_{12}$ aliphatic monocarboxylate salts such as octanoic acid salts and neodecanoic acid salts, tall oil fatty acid salts, and naphthenic acid salts.

The proportions of the amino alcohol and the cobalt soap to be used are not particularly limited. However, it is preferable that the amount of the amino alcohol be in the range of 3 parts by weight or less with respect to 1 part by weight of cobalt metal in the cobalt soap. It is particularly preferable that the amount of the amino alcohol be in the range of 1 to 3 parts by weight with respect to 1 part by weight of cobalt metal in the cobalt soap for good gloss and adhesion of the coating film.

The proportions of the manganese soap and the cobalt soap to be used are not particularly limited. However, it is preferable that the amount of manganese metal in the manganese soap be in the range of 1.0 part by weight or less with respect to 1 part by weight of cobalt metal in the cobalt soap. It is particularly preferable that the amount of manganese metal in the manganese soap be in the range of 0.1 to 1.0 parts by weight with respect to 1 part by weight of cobalt metal in the cobalt soap for good hardness and adhesion of the coating film.

It should be added that under the same conditions for storing coatings, for example, after preparation, the time for a coating with the curing accelerator containing a cobalt soap, a manganese soap, and an amino alcohols to become semi-dry to touch (tack free) is shorter than that for a coating with a curing accelerator containing a cobalt soap and an amino alcohol.

As the amino alcohol for the present invention, any known and conventional ones can be used, examples of which include monoethanolamine, diethanolamine, triethanolamine, dimethyl ethanolamine, diethyl ethanolamine, dibutyl ethanolamine, methyl ethanolamine, methyl diethanolamine, ethyl ethanolamine, n-butyl ethanolamine, n-butyl diethanolamine, t-butyl ethanolamine, t-butyl diethanolamine, dimethyl isopropanolamine, dimethyl butanolamine, dimethyl hexanolamine, and dimethyl-aminophenol. One or several of these amino alcohols may be chosen and used. However, diethanolamine, diethyl ethanolamine, dibutyl ethanolamine, and n-butyl diethanolamine are particularly preferable.

The curing accelerator according to the present invention is used by blending the cobalt soap, the manganese soap, and the amino alcohol with a resin having an unsaturated fatty acid group in its molecules. It is preferable that the cobalt soap, the manganese soap, and the amino alcohol be used as a solution prepared by dissolving the cobalt soap, the manganese soap, and the amino alcohol in a solvent. The cobalt soap, the manganese soap, and the amino alcohol may be mixed in advance, and then blended with the resin.

Examples of such a solvent are hydrocarbon solvents such as toluene, xylene, heptane, hexane, cyclohexane, and mineral spirits; alcohol solvents such as methanol, ethanol, propanol, and cyclohexanol; ketone solvents such as methyl ethyl ketone, methyl isobutyl ketone, and cyclohexanone; and ether solvents such as propyl ether, methyl cellosolve, cellosolve, butyl cellosolve, methyl carbitol, and butyl carbitol. One or several of these solvents may be chosen and used.

As the resin for a coating or the resin for a printing ink having an unsaturated fatty acid group in its molecules to be blended with the curing accelerator according to the present invention, any known and conventional ones can be used, examples of which are resins whose curing can be accelerated through oxidation polymerization initiated by the cobalt soap. Specific examples are drying oils and semi-drying oils, such as alkyd resins containing as a main ingredient, for example, a castor oil, a coconut oil, a linseed oil, a tung oil, a soybean oil, a tall oil, a safflower oil, or a synthetic drying oil, and oil-modified resins such as modified phenol resins and epoxy ester resins.

The amount of the curing accelerator to be blended, converted to the amount of cobalt metal atoms, is in the range of 0.001 to 1 parts by weight, preferably 0.01 to 0.2 parts by weight, with respect to 100 parts by weight of non-volatile contents of the resin for a coating or a printing ink which has an unsaturated fatty acid group in its molecules. As the occasion demands, a metallic soap of iron, nickel, copper, zinc, zirconium, bismuth, cerium, calcium, or the like, a pigment of various types, an anti-sagging agent, an anti-skinning agent, and other types of additives may be blended in.

The present invention also includes an embodiment as a curing accelerator, which is applicable to a resin for a coating or a printing ink which has an unsaturated fatty acid group in its molecules, containing at least one type of metallic soap selected from the group consisting of an iron soap, a nickel soap, a copper soap, a zinc soap, a zirconium soap, a bismuth soap, a cerium soap, and a calcium soap as a main substance, and a cobalt soap (A), a manganese soap (B), and an amino alcohol (C) added to the main substance. In this case, the curing accelerator of the present invention functions as a reforming agent for the metallic soap which is the largest component.

However, a combined use of an aluminum chelate compound with the cobalt soap used in the present invention is not preferable since the aluminum chelate compound colors the resin reddish orange due to a mutual reaction with an methyl ethyl ketone oxime, which is widely used as an anti-skinning agent in coatings, and contaminates the hue of the coating, and since the aluminum chelate compound undergoes a crosslinking reaction with a resin component resulting in an increase in the viscosity of the resin during storage. Therefore, it is preferable that a metallic compound component which directly takes part in the curing of the resin be only a cobalt soap and a manganese soap, or a cobalt soap, a manganese soap, and one or several of other metallic soaps selected from the group consisting of a calcium soap, an iron soap, a nickel soap, a copper soap, a zinc soap, a zirconium soap, a bismuth soap, and a cerium soap.

The curing accelerator of the present invention is used by addition to a resin for a coating or a printing ink having an unsaturated fatty acid group in its molecules. By doing so, a coating composition or a printing ink composition can be prepared. The thus-prepared coating or printing ink is suitably applied or printed with a desired thickness of a layer (film), and dried. In this case, the thickness of the layer may be normally chosen from the range of 1 to 500 $\mu$m.

EXAMPLES

In the following, the present invention will be more specifically described with reference to Examples and Comparative Examples. In these examples, all values in "parts" or "%" are based on weights.

Examples 1 to 5

1960 g of titanium white pigment ("TIPAQUE R-820" manufactured by Ishihara Sangyo Kaisha, Ltd.), 3340 g of resin for a coating, "BECKOSOL P470-70" (manufactured by Dainippon Ink and Chemicals, Inc.; an alkyd resin having an unsaturated fatty acid group in its molecules), and 280 g drying the coating obtained, coloration of the coating, and properties of the coating film were evaluated. The results are shown in Table 1.

TABLE 1

| | | Example | | | | | Comparative |
|---|---|---|---|---|---|---|---|
| Item | | 1 | 2 | 3 | 4 | 5 | Example 1 |
| Amino alcohol/cobalt (wt %) | | 2.0 | 1.6 | 3.0 | 1.8 | 2.0 | — |
| Manganese/cobalt (wt %) | | 0.50 | 1.00 | 0.67 | 0.10 | 0.40 | — |
| Added amount *1) | Co-NAPHTHENATE 6% (part) | 0.04 | 0.05 | 0.03 | 0.06 | 0.05 | 0.05 |
| | Mn-NAPHTHENATE 6% (part) | 0.02 | 0.05 | 0.02 | 0.006 | 0.02 | — |
| | Pb-NAPHTHENATE 15% (part) | — | — | — | — | — | 0.40 |
| | Diethanolamine (part) | 0.08 | — | — | — | — | — |
| | Diethyl ethanolamine (part) | — | 0.08 | — | — | — | — |
| | Dibutyl ethanolamine (part) | — | — | 0.09 | — | 0.03 | — |
| | n-Butyl diethanolamine (part) | — | — | — | 0.11 | — | — |
| | Dimethyl butanolamine (part) | — | — | — | — | 0.07 | — |
| Drying time (hour) *2) | Immediately after preparation (wet film thickness: 76 μm) | 8.2 | 8.2 | 8.5 | 7.9 | 7.4 | 11.3 |
| | 14 days after preparation (wet film thickness: 76 μm) *3) | 8.7 | 8.7 | 8.8 | 8.4 | 7.9 | 11.5 |
| Coloration of coating *4) | | ○ | ○ | ○ | ○ | ○ | ○ |
| Properties of coating film | Gloss | 80 | 83 | 82 | 81 | 81 | 73 |
| | Sward hardness rocker | 26 | 25 | 26 | 25 | 25 | 25 |
| | Pencil hardness | 3H | 2H | 2H | 2H | 3H | H |
| | Cross cut | 100 | 100 | 100 | 100 | 100 | 96 |
| | Water resistance (for 7 days) *5) | ○ | ○ | ○ | ○ | ○ | ○ |

*1) Added amount: the metallic content or the amino alcohol content with respect to 100 parts of non-volatile contents of the resin.
*2) Drying time: measured at a temperature of 25° C. and with a humidity of 60%.
*3) Measurement was performed after storing the coating in which the curing accelerator was blended for 14 days at 60° C..
*4) Coloration of coating: the coating in which the curing accelerator was blended was visually inspected after the coating was stored for 3 days at 60° C..
○: No coloration was observed.
x: Coloration was observed.
*5) Water resistance: the coating film on the plate was immersed in water for 7 days, and the coating film on the plate was visually inspected.
○: No abnormality was observed.
x: Some abnormality was observed.
*1) to *4) are also applicable to Table 2 below.

of mineral spirit, 20 g of anti-skinning agent (methyl ethyl ketone oxime) were kneaded using a three-roll mill to obtain a basic coating. To 40 g of this basic coating, "Co-NAPHTHENATE 6%" and "Mn-NAPHTHENATE 6%" (trade names; manufactured by Dainippon Ink and Chemicals, Inc.) and an amino alcohol were added in the proportions shown in Table 1 (proportions of a cobalt metal content, a manganese metal content, and an amino alcohol content with respect to 100 parts of non-volatile contents of the resin) to prepare the coating for each Example, and the coloration of the coating was evaluated. In addition, the coating was spread on a glass plate using an applicator to form a wet coating film with a thickness of 76 μm. Time for drying the wet coating film was measured using an RCI (trademark of REICHHOLD CHEMICALS INC. of U.S.A.)—type drying recorder, and the properties of the coating film obtained were also measured. All the results are shown in Table 1.

Comparative Example 1

For the purpose of demonstrating the average levels of properties of a curing accelerator belonging to the prior art, "Co-NAPHTHENATE 6%" and "Pb-NAPHTHENATE 15%" (both trade names; manufactured by Dainippon Ink and Chemicals, Inc.) were added to 40 g of the above basic coating in proportions shown in Table 1 (proportions of a cobalt metal content and a lead metal content with respect to 100 parts of non-volatile contents of the resin), and time for Method of Evaluating Coating Film Properties "Gloss"

A coating was spread on a glass plate using an applicator to form a wet coating film having a thickness of 152 μm, and the wet coating film was dried for 3 days at a temperature of 25° C. with a humidity of 60%. A gloss test was performed on the obtained coating film in accordance with the test procedures for specular gloss at 60 degrees in JIS K5400.

"Sward Hardness Rocker"

A coating was spread on a glass plate using an applicator to form a wet coating film having a thickness of 38 μm, and the wet coating film was dried for 3 days at a temperature of 25° C. with a humidity of 60%. A Sward hardness rocker test was performed on the obtained coating film, and the measurement obtained using a Sward type hardness rocker testing device (manufactured by Tester Sangyo Co., Ltd.) is expressed as a proportion to the measurement obtained with respect to a glass plate as 100.

"Pencil Hardness"

A coating was spread on a steel plate defined by JIS G3141 using an applicator to form a wet coating film having a thickness of 76 μm, and the wet coating film was dried for 3 days at a temperature of 25° C. with a humidity of 60%. A pencil hardness test was performed on the obtained coating film in accordance with the procedures of the pencil scratching test in JIS K5400.

"Cross Cut"

A coating was spread on a steel plate defined by JIS G3141 using an applicator to form a wet coating film having a thickness of 76 μm, and the wet coating film was dried for 3 days at a temperature of 25° C. with a humidity of 60%. A cross-cut test was performed on the obtained coating film in accordance with the cross-cut adhesion test in JIS K5400. A cellulose adhesive tape was stuck on the coating film in parallel with the direction of application, and then removed. The number of cross-cut cells of the coating film which remained stuck on the tape out of a total of 100 cells was counted and is shown.

"Water Resistance"

A coating was spread on a glass plate using an applicator to form a wet coating film having a thickness of 152 μm, and the wet coating film was dried for 3 days at a temperature of 25° C. with a humidity of 60%. A water resistance test was performed on the obtained coating film in accordance with the procedures of the water resistance test in JIS K5400.

Comparative Tests 3 to 5

"Co-NAPHTHENATE 6%" and "Mn-NAPHTHENATE 6%" (both trade names; manufactured by Dainippon Ink and Chemicals, Inc.) and an aluminum chelate (trade name "DICNATE AL-500"; manufactured by Dainippon Ink and Chemicals, Inc.), and 2,2'-bipyridyl were added to 40 g of the above basic coating in proportions shown in Table 2 (proportions of a metallic content and a 2,2'-dipyridyl content with respect to 100 parts of non-volatile contents of the resin), and the drying time for the coating obtained and the coloration of the coating were evaluated. The results are shown in Table 2.

TABLE 2

| Item | Comparative Example | | |
|---|---|---|---|
| | 3 | 4 | 5 |
| Added amount *1) | | | |
| Co-NAPHTHENATE 6% (part) | — | 0.05 | 0.05 |
| Mn-NAPHTHENATE 6% (part) | 0.05 | — | — |
| DICNATE AL-500 (part) | — | 0.10 | — |
| 2,2'-Bipyridyl (part) | 0.18 | — | 0.18 |
| Drying time (hour) *2) | | | |
| Immediately after preparation (wet film thickness: 76 μm) | 11.7 | 9.0 | 5.5 |

TABLE 2-continued

| Item | Comparative Example | | |
|---|---|---|---|
| | 3 | 4 | 5 |
| 14 days after preparation (wet film thickness: 76 μm) *3) | 48 or longer | 9.2 | 5.8 |
| Coloration of coating *4) | x | x | x |

What is claimed is:

1. A curing accelerator for a resin having an unsaturated fatty acid group in its molecules, the curing accelerator containing:
   a cobalt soap (A),
   a manganese soap (B), and
   an amino alcohol (C).

2. A curing accelerator according to claim 1, wherein the amino alcohol is at least one selected from the group consisting of diethanolamine, diethyl ethanolamine, dibutyl ethanolamine, and n-butyl diethanolamine.

3. A curing accelerator according to claim 1, which contains the amino alcohol in an amount of 1 to 3 parts by weight with respect to 1 part by weight of cobalt metal in the cobalt soap.

4. A curing accelerator according to claim 1, which contains manganese metal in an amount of 0.1 to 1.0 parts by weight in the manganese soap with respect to 1 part by weight of cobalt metal in the cobalt soap.

5. A coating composition containing as essential components a resin for a coating having an unsaturated fatty acid group in its molecules and a curing accelerator as in claim 1.

6. A printing ink composition containing as essential components a resin for a printing ink having an unsaturated fatty acid group in its molecules and a curing accelerator as in claim 1.

7. A curing accelerator for a resin having an unsaturated fatty acid group in its molecules, the curing accelerator consisting essentially of:
   a cobalt soap (A),
   a manganese soap (B)
   an amino alcohol (C), and
   a solvent (D).

* * * * *